United States Patent [19]

Nelson

[11] 4,010,248

[45] Mar. 1, 1977

[54] PROCESS FOR PRODUCING TRIALKALI METAL ALUMINUM HEXAHYDRIDE

[75] Inventor: Gunner E. Nelson, Baton Rouge, La.

[73] Assignee: Ethyl Corporation, Richmond, Va.

[22] Filed: Nov. 20, 1974

[21] Appl. No.: 525,394

Related U.S. Application Data

[63] Continuation-in-part of Ser. No. 512,120, Oct. 4, 1974.

[52] U.S. Cl. .............................. 423/644; 260/448 A
[51] Int. Cl.$^2$ ......................................... C01B 6/04
[58] Field of Search ................ 423/644; 260/448 A

[56] References Cited

UNITED STATES PATENTS

| 2,786,860 | 3/1957 | Ziegler et al. | 260/448 A |
|---|---|---|---|
| 2,915,542 | 12/1959 | Robinson et al. | 260/448 A |
| 3,098,706 | 7/1963 | Blitzer et al. | 260/448 A |
| 3,143,542 | 8/1964 | Ziegler et al. | 260/448 A |
| 3,686,248 | 8/1972 | Nelson | 260/448 A |

FOREIGN PATENTS OR APPLICATIONS

| 1,515,581 | 3/1968 | France |
| 1,116,664 | 11/1961 | Germany |
| 1,080,019 | 8/1967 | United Kingdom |
| 223,788 | 11/1968 | U.S.S.R. |

OTHER PUBLICATIONS

Chemical Abstracts, v67, 70140c (1967).
Ashby et al., Inorganic Chemistry v2 pp. 499–504 (1963).
Ashby et al., Inorganic Chemitry v5, pp. 1615–1617 (1966).
Chemical Abstracts, v64, 13803b (1966).

*Primary Examiner*—Helen M. S. Sneed
*Attorney, Agent, or Firm*—Donald L. Johnson; John F. Sieberth; Shelton B. McAnelly

[57] ABSTRACT

This invention relates to the preparation of alkali metal aluminum dihydrocarbon dihydrides and in particular to such compounds of sodium, potssium or lithium having hydrocarbon radicals containing from 2 to about 30 carbon atoms per radical. Such dihydrocarbon materials, as typified by sodium aluminum diethyl dihydride, and by the potassium or lithium counterparts, either singly or in mixtures with respect to alkali metals and hydrocarbon groups, are soluble and useful in inert aromatic hydrocarbon solvents and have excellent mild reducing properties for various functional groups such as carbonyl groups in various organic compounds.

18 Claims, 2 Drawing Figures

PROCESS FOR PRODUCING TRIALKALI METAL ALUMINUM HEXAHYDRIDE

CROSS-REFERENCE TO RELATED APPLICATIONS

This application is a containuation-in-part of application Ser. No. 512,120, filed Oct. 4, 1974.

DESCRIPTION OF THE PRIOR ART

Previously known processes for the preparation of alkali metal aluminum dihydrocarbon dihydrides have suffered from several disadvantages. German Pat. No. 918,928 describes the preparation of sodium or lithium aluminum dialkyl dihydrides by reacting dialkyl aluminum hydrides or dialkyl aluminum halides with sodium hydride. These reactions preferably are conducted with oil-free alkali metal hydride to avoid the need for subsequent removal of the oil present with oil-dispersion sodium hydride.

The dialkyl aluminum halide reaction further suffers from the disadvantage that it requires the preparation of the halide material and that in the process some of the alkali metal value is converted to an alkali metal halide salt of low value.

Another process for producing alkali metal aluminum dihydrocarbon dihydrides is shown in German Pat. No. 1,116,664 wherein trialkyl aluminum is reacted with alkali metal and hydrogen. This process suffers from the disadvantage that one of the three alkyl groups on the starting trialkyl aluminum is lost by conversion thereof to hydrocarbon.

Another process for producing alkali metal aluminum dihydrocarbon dihydrides is described in U.S. Pat. No. 3,686,248. Although this is an excellent process for producing the desired product in high yield, further improvement is desirable since at times there may be a tendency toward the deposition of aluminum on reactor surfaces.

One of the major problems in prior art processes for producing alkali metal aluminum dihydrocarbon dihydride has been the need for high pressure apparatus at several process steps. Since high pressure appartus is costly, it is desirable to provide a process in which the amount of processing that requires high pressure apparatus is minimized.

SUMMARY OF THE INVENTION

The present invention provides a process for producing alkali metal aluminum dihydrocarbon dihydrides wherein only one process step is required to be conducted at high pressure. Other process steps can be conducted at low pressures, e.g. at 100 psig or below, even at substantially atmospheric pressure.

It has been discovered that when alkali metal, aluminum and hydrogen are reacted under suitable conditions in the presence of an inert aromatic hydrocarbon solvent for alkali metal aluminum dihydrocarbon dihydride and a catalytic amount of at least about 0.001 percent by weight of alkali metal aluminum dihydrocarbon dihydride, trihydrocarbon aluminum, hydrocarbon aluminum dihydride, or dihydrocarbon aluminum hydride, that trialkali metal aluminum hexahydride can be formed. Thereafter the trialkali metal aluminum hexahydride is readily converted into alkali metal aluminum dihydrocarbon dihydride by reaction with trihydrocarbon aluminum even at low pressure in the presence of the solvent under conditions suitable to form the alkali metal aluminum dihydrocarbon dihydride product.

Accordingly, the present invention relates to a process for producing an alkali metal aluminum dihydrocarbon dihydride which comprises reacting alkali metal, aluminum and hydrogen in the presence of an inert aromatic hydrocarbon solvent for the alkali metal aluminum dihydrocarbon dihydride and a catalytic amount of at least about 0.001 percent by weight of alkali metal aluminum dihydrocarbon dihydride, trihydrocarbon aluminum, hydrocarbon aluminum dihydride, or dihydrocarbon aluminum hydride, based on the alkali metal fed to the process, at a temperature from about 100° to about 180° C and at a pressure of from about 50 to about 5000 psig for a period of time of from about 0.001 to about 12 hours. As a result of the performance of this step, there is produced a system of trialkali metal aluminum hexahydride in inert aromatic hydrocarbon solvent. In the next step of the process, the trialkali metal aluminum hexahydride produced in the preceding step is reacted with a trihydrocarbon aluminum in the presence of said solvent at a temperature from about 0° to about 180° C and a pressure of from about 1 atomsphere to about 100 atmospheres for a period of time of from about 0.5 to about 12 hours, thereby producing alkali metal aluminum dihydrocarbon dihydride.

Preferably the catalyst used in the first step of the process is an alkali metal aluminum dihydrocarbon dihydride since such material is readily retained in the reaction vessel as a heel of the product from a preceding run. Preferred catalysts have alkyl hydrocarbon groups with from about 2 to about 30 cabon atoms per group, preferably from about 2 to about 6 carbon atoms per alkyl group. Especially preferred catalyst is sodium aluminum diethyl dihydride. Another suitable catalyst useful for the first step of the process is trihydrocarbon aluminum. This catalyst is suitably used where a heel of alkali metal aluminum dihydrocarbon dihydride is not available and is a preferred catalyst since trihydrocarbon aluminum is used in a subsequent step of the process.

Preferred trihydrocarbon aluminum catalyst at step A or reactant at step B is a trialkyl aluminum having alkyl groups as defined for the alkali metal aluminum dihydrocarbon dihydride in the foregoing. Preferred catalysts or reactants of this class are triethyl aluminum and triisobutyl aluminum.

Another suitable class of catalysts is dihydrocarbon aluminum hydride with hydrocarbon groups as defined for the alkali metal aluminum dihydrocarbon dihydrides, typically diethyl aluminum hydride.

In a preferred aspect of the present process, the product is a sodium aluminum dihydrocarbon dihydride, the alkali metal used in the process being sodium. Another preferred alkali metal used in the present process is potassium whereby potassium aluminum dihydrocarbon dihydrides are produced. Another alkali metal used in the present process is lithium whereby lithium aluminum dihydrocarbon dihydrides are produced.

Preferred solvents are toluene, xylene and benzene, especially toluene because of the convenient solubility properties and convenient vapor pressure.

Preferably the present process utilizes a pressure at step A of from about 100 to about 2000 psig, especially from about 500 to about 1250 psig.

Preferably the temperature at step A of the present process is from about 110° C to about 170° C, especially from about 125° C to about 160° C. Preferably the temperature of step A of the present process is about 170° C and the temperature of step B is from about room temperature to about 170° C.

Although the amount of catalyst used in the present process is not critical, it is desired to have enough catalyst present to provide a suitble reaction without having so much present as to monopolize unduly the reactor capacity. Thus, the amount of catalyst usually ranges from about 0.1 percent to about 50 percent by weight based on the alkali metal fed to the process, preferably from about 1 percent to about 20 percent by weight based on the alkali metal fed to the process, especially from about 10 to about 15 percent by weight based on the alkali metal fed to the process.

In a preferred aspect, the trihydrocarbon aluminum compound used at step B is triethyl aluminum, the alkali metal reacted is sodium, the temperature at step A is from about 110° C to about 170° C, the pressure of step A is from about 500 to about 1250 psig and the amount of catalyst fed at step A is from about 10 to about 15 percent by weight based on the sodium reactant fed to the process.

In a preferred aspect, the pressure at step B is from about 0 to about 50 psig.

Preferably a molar excess of aluminum is fed, ranging from about stoichiometric to about 50 percent excess above stoichiometric based on the alkali metal and trihydrocarbon aluminum fed to the reaction. Excess aluminum is readily retained or recovered for subsequent use.

DESCRIPTION OF THE PREFERRED EMBODIMENTS

Figure 1:
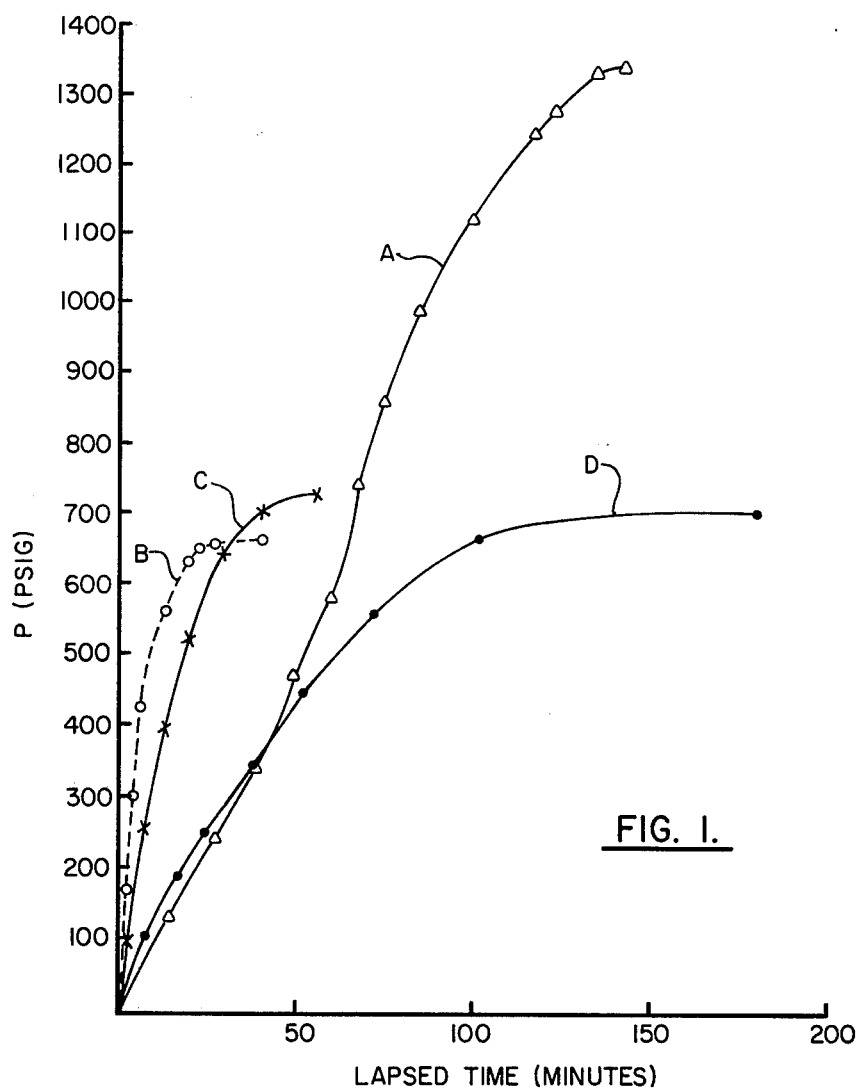
FIG. 1 of the drawings shows a group of four curves of pressure versus reaction time for the hydriding step of Examples I, II, III, and V.

A key aspect of the preferred embodiments of the present invention is the reaction of substantially all of the hydrogen required to be fed to the process at the first step to produce an intermedite compound; viz, trialkali metal aluminum hexahydride, which contains all of the hydrogen required for a subsequent reaction of the intermediate with trihydrocarbon aluminum to form the product alkali metal aluminum dihydrocarbon dihydride. An outstanding feature of the reaction of trialkali metal aluminum hexahydride with trihydrocarbon aluminum is that the reaction proceeds readily even at room temperarture and atmospheric pressure especially in aromatic hydrocarbon solvent, with the result that only the first step hydriding reaction is required to be conducted at elevated pressure. This provides a significant improvement over processes that require two or more steps to be conducted at pressures of the order of 1000 psig or higher.

Although all the conditions used for the present process are important in regard to rate and such matters, the only critical aspect is temperature, it having been discovered that the temperature at the first step A must not exceed about 180° C, otherwise the product of step A is alkali metal hydride rather than trialkali metal aluminum hexahydride. In general, the maximum suitable temperature is in the range from about 160° to about 180° C with the lower limit being preferred where it is desired to minimize the amount of alkali metal hydride in the intermediate product.

In performing the process of the present invention, it is usually preferred to use a high pressure autoclave for step A and thereafter to react the trialkali metal aluminum hexahydride with the trihydrocarbon aluminum at step B at a pressure which is about autogenous. In general, the autogenous pressure is determined largely by the solvent used. Temperatures of the order of about 100° to about 150° C usually result from the mixing of the intermediate product trialkali aluminum hexahydride with room temperature trihydrocarbon aluminum without significant intervening cooling. As a result, the pressure at the B step of the process usually does not exceed about 5 atmospheres and may be at room temperature or below to avoid super atmospheric pressures entirely if cooling is employed. The use of pressures of from about 1 to about 5 atmospheres at step B materially reduces the amount of processing time required in the high pressure autoclave utilized for the hydriding reaction. In general, the reaction of B begins as soon as contact is initiated between trialkali metal aluminum hexahydride and the trihydrocarbon aluminum.

Although the preparation of trialkali metal aluminum hexahydride is known in the prior art being described, for example, by E. C. Ashby and P. Kobetz in Inorganic Chemistry, Vol. 5, No. 9, Note pages 1615 to 1617 (September 1966), it was generally considered that pressures of the order of 2000–5000 psig were required to produce alkali metal aluminum hexahydride. Thus, it was surprising that trialkali metal aluminum hexahydride would form in a satisfactory manner at pressures of the order of a typical 1000 psig. It was even more surprising to discover that trialkali metal aluminum hexahydride is a useful intermediate in the preparation of alkali metal aluminum dihydrocarbon dihydride and to find that temperature at the hydriding step was so important in causing the formation of such an intermediate.

When the hydriding step A is performed at temperatures of from about 180° to about 325° C, the reaction product of the hydriding step is predominantly alkali metal hydride even where excess aluminum is present. When trihydrocarbon aluminum is combined with such alkali metal hydride intermediate product, the reaction of additional aluminum and of additional hydrogen in a subsequent hydriding step is necessary to produce alkali metal aluminum dihydrocarbon dihydride. Although such a dual hydriding process itself constitutes a significant improvement over the prior art, the preferred process wherein all of the necessary hydriding is accomplished in a single step avoids the need for two high pressure autoclaves or for performing two different steps on a time sharing basis with a single autoclave. As shown herein by various comparative examples, where the temperature of the first step of the process is from about 180° to about 325° C, the reaction products are similar regardless of whether excess aluminum is present at the first step and regardless of how long a time is allowed for the first step. At temperatures of from about 180° to about 325° C, the first hydriding step readily produces substantially complete hydriding of the available alkali metal without any appreciable hydriding of the excess aluminum present. In sharp contrast to this, when the first step is operated at the lower temperature range of from about 100° to about 180° C, preferably no higher than about 170° C, more preferably no higher than about 160° C, typically 175° C, 165° C, 150° C and 125° C, an entirely different operation results. Under the preferred conditions, and with co-present aluminum, the uptake of hydrogen continues well past the amount of hydrogen corresponding to the hydriding of the alkali metal present. The hydrogen uptake difference is dramatically shown by curve A of FIG. 1 which can be compared with the other curves of FIG. 1 and with the curves of FIG. 2. With the reaction of the extra amount of hydrogen involved in the prolonged high reaction rate of curve A of FIG. 1, the amount of hydrogen that reacts at the first step can be sufficient to supply all of the hydrogen needed for the product alkali metal aluminum dihydrocarbon dihydride so that only a single hydriding reaction step is required.

The alkali metal aluminum dihydrocarbon dihydride used or produced is preferably of the formula $MAlR_2H_2$ wherein M is alkali metal and R is similar or different alkyl group having from about 2 to about 30 carbon atoms per alkyl group. More preferably, the R's are similar or different alkyl groups having from about 2 to about 6 carbon atoms per alkyl group. Preferably, the alkali metal aluminum dihydrocarbon dihydride is sodium aluminum diethyl dihydride or sodium aluminum diisobutyl hydride, especially the former.

Although the R groups of reactants and/or catalyst can contain olefinic unsaturation, or can be branched and can contain innocuous substitution, generally they are primarily of a "carrier" nature in the use of the product so that low cost, availability and reactivity are the principal factors which suggest or control which radicals are preferred. Thus preferred hydrocarbon radicals are alkyl groups, especially those having from two to about six carbon atoms per group. Typical preferred radicals are ethyl, propyl, isopropyl, n-butyl, isobuty, n-pentyl, n-hexyl and the like. A preferred radical is ethyl since this is readily obtained by using low cost readily available, excellently reactive triethyl aluminum as a reactant in the process of the present invention and because the lower molecular weight hydrides (i.e., those with the smaller hydrocarbon radicals) have greater effectiveness per pound as reducing agents.

Preferaby the alkali metal used to produce the alkali metal component of the intermediate trialkali metal aluminum hexahydride as well as the product alkali metal aluminum dihydrocarbon dihydride is sodium, potassium or lithium, listing them in the order to preference; however, other alkali metals of Group I-A of the Periodic Table (Fisher Scientific Co. 1955) can be used. For uniformity of product, the alkali metal of any alkali metal aluminum dihydrocarbon dihydride catalyst used in the process is preferably the same as the alkali metal reacted with hydrogen and aluminum to produce the trialkali metal aluminum hexahydride. In other instances, the alkali metal of the alkali metal aluminum dihydrocarbon dihydride used as catalyst is different from the alkali metal fed for the reaction with hydrogen. Thus, for example, one may use lithium, or potassium, or sodium aluminum diethyl dihydride or mixtures thereof as catalyst in the preparation of trisodium aluminum hexahydride or tripotassium aluminum hexahydride, or trilithium aluminum hexahydride.

Since the alkali metals represents a small class of materials with similar properties, the various alkali metals behave similarly as reactants to produce trialkali metal aluminum hexahydride or as components in the alkali metal aluminum dihydrocarbon dihydrides catalyst. Thus the choice of alkali metal for either is usually determined by economics or by the purpose for which the product is to be used. Particularly is this true of the reduction use of alkali metal aluminum dihydrocarbon dihydrides wherein the most important aspects are cost and the reactivity of the Al—H bonds.

Although an alkali metal aluminum dihydrocarbon dihydride is usually a preferred catalyst for the present process, other catalysts as defined herein may be used. In general, the amount of catalyst used in the catalyzed reaction of alkali metal, hydrogen and aluminum to produce trialkali metal aluminum hexahydride is not especially critical. In general, at least a catalytic amount is used. The minimum practical catalytic amount required or required to be added is readily determined for specific cases by simple routine experimentation using the procedures described herein and used in the appended examples. In general, the minimum catalytic amount is about 0.001 percent by weight based upon the alkali metal fed for the reaction with the hydrogen. On the other hand, the term "effective amount" includes any amount deliberately added or allowed to remian so as to provide catalysis. Although there is no upper limit upon the amount of catalyst that can be used, generally there is no particular need to feed more catalyst than about 50 percent by weight based upon the alkali metal fed for the reaction and above this amount, reactor capacity is needlessly monopolized by catalyst. Of course, if one wishes to use more catalyst, the fundamental process is admirably suited to such in most instances since most of the catalysts defined are soluble in aromatic hydrocabons such as toluene and others recited herein while the reactant alkali metal and the intermediate product trialkali metal aluminum hexahydride are virtually insoluble in such hydrocarbons. Thus simple decantation or filtration operations can readily separate the catalyst as an aromatic hydrocarbon solution. Furthermore, since the preferred $MAlR_2H_2$ catalyst is a material that is also an especially desirable product readily manufactured as disclosed herein from trialkali metal aluminum hexahydride, the separation of the catalyst from the trialkali metal aluminum hexahydride is frequently entirely unnecessary leaving the reactor monopolization factor as the principal reason for specifying an upper limit upon the amount of catalyst to use.

Solvents used in the present process are preferably inert aromatic hydrocarbon solvents for the alkali metal aluminum dihydrocarbon dihydride product of the present process. In regard to the alkali metal and the trialkali metal aluminum hexahydride, these solvents are obviously essentially only diluents; however, such a diluent facilitates contact between the alkali metal and the catalyst for the first step A and between the trialkali metal aluminum hexahydride and the trihydrocarbon aluminum in step B. Preferred solvents are toluene, xylene, benzene and ethylbenzene since these are inert, are readily available at low cost and because the alkali metal aluminum dihydrocarbon dihydrides have excellent solubility therein. As a preferred aspect, the solvent is chosen so as to represent a preferred solvent for product alkali metal aluminum dihydrocarbon dihydride. Since toluene, xylene and benzene are preferred solvents for the handling and use of alkali metal aluminum dihydrocarbon dihydrides, it is usually preferred to use one of these solvents, especially toluene, in the trialkali metal aluminum hexahydride production step and to carry the solvent through the succeeding processing whereby the alkali metal aluminum dihydrocarbon dihydride is produced from the trialkali metal aluminum hexahydride. Since the solvent is exposed to elevated temperatures in the process, it is preferred to utilize a solvent which has a high critical temperature to which end toluene is a preferred solvent.

The amount of solvent used is not particularly critical; howver, in general the amount is determined on a basis of the amount required to solubilize the product alkali metal aluminum dihydrocarbon dihydride, usually being only slightly greater than such a required solubilizing amount. More solvent can be used; however, this is usually less desirable because the solvent occupies reactor space. Less solvent can be used; however, usually there is no particular advantage in using much less than the solubilizing amount because of the adverse effect upon viscosity of the reaction mass.

Where less than the total solvent required to solubilize the product alkali metal aluminum dihydrocarbon dihydride is fed during the reactions, it is usually desired to add the balance of the required solvent to the reaction mass after the reaction to facilitate product removal from the reactor; however, where a heel of the product alkali metal aluminum dihydrocarbon dihydride is retained in the reactor as catalyst for a subsequent run it can be retained as a particulate solid as well as in solution.

The preferred alkali metl aluminum dihydrocarbon dihydride compounds are soluble to at most only about 25–30 percent by weight in the solvents. Normally this is not of any particular problem except where the production of the most concentrated product alkali metal aluminum dihydrocarbon dihydride is desired, for example, to minimize shipping costs. In such instances, the solubility of alkali metal aluminum dihydrocarbon dihydride can be enhanced considerably through the use of suitable innocuous Lewis bases as co-solvent as described in U.S. Pat. No. 3,696,047, the disclosure of which, like the disclosure of U.S. Pat. No. 3,686,248, is herewith incorporated herein by reference. Thus, for example, as shown by Example VI, one can add such Lewis bases as tetrahydrofuran after the final step reaction. In general, it is preferred to avoid the presence of the Lewis bases during the hydriding reactions so that where a heel of the alkali metal aluminum dihydrocarbon dihydride is to be retained in the reactor or a portion withdrawn and returned as catalyst, it is preferred to add the Lewis base to the product system after provision has been made for the retention of catalyst material.

The reaction to produce trialkali metal aluminum hexahydride requires the feed not only of sodium, hydrogen and catalyst but also requires the feed of aluminum, preferably of a reactive or activated type, preferably in the form of powder. Preferred aluminum powder contains an alloying agent such as titanium or zirconium to enhance the reactivity. It is believed that the reactions proceed as indicated herein-after:

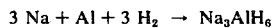

The amount of aluminum fed is usually at least the amount required for formation of the trialkali metal aluminum hexahydride. The feed of an excess of aluminum, e.g. 1–20 percent, is usually desirable to insure complete reaction at a rapid rate; however, less aluminum can be used if desired. The feed of an excess of aluminum normally presents no problem since unreacted aluminum is readily retained in the reactor or separated and returned to it for use in a subsequent batch.

Except for the temperature aspect as described herein in detail, the physical conditions used for the reaction are not critical and have been disclosed herein to an extent more than ample to permit optimization in any respect by routine experimentation by one of ordinary skill in the art. The present examples illustrate the effect of various factors, seeking substantially complete reaction of the limiting reactant or reactants to the product of each respective stage.

Thus the aluminum and hydrogen are usually fed in excess above the stoichiometric amount required for the formation of the trialkali metal aluminum hexahydride, the limiting reactant being the alkali metal. Normally, however, one prefers to use stoichiometric proportions of one mol of trialkali metal aluminum hexahydride and two mols of trihydrocarbon aluminum in the conversion of the trialkyl metal aluminum hexahydride to alkali metal aluminum dihydrocarbon dihydride.

For the examples, the reactor and all reactants fed are preferably placed in an anhydrous condition; however, residual moisture is readily removed where necessary by a preliminary contacting of the materials, for example, the toluene with alkali metal aluminum dihydrocarbon dihydride such as sodium aluminum diethyl dihydride or feeding the alkali metal last or bubbling the hydrogen through alkali metal aluminum dihydrocarbon dihydride. This material reacts readily but gently with water avoiding the violent reactions experienced where the water is contacted first with trihydrocarbon aluminum, alkali metal or alkali metal hydride.

From the foregoing and from the appended examples and claims, it is apparent to those skilled in the art that numerous arrangements can be made of the teachings, features and aspects of the present invention and that the invention is not to be limited except in accordance with the appended claims.

EXAMPLE I

The 2-liter reactor was charged with 800 ml of toluene, 81.5 grams sodium, 39.8 grams aluminum powder and 31.0 grams of a 25 wt. percent solution of sodium aluminum diethyl dihydride in toluene. (7.75 grams $NaAl(C_2H_5)_2H_2$). The system was purged with hydrogen and approximately 100 psig hydrogen pressure allowed to remain in the reactor as heating was begun. The stirrer was turned on when the temperature reached 125° C. (The metling point of sodium is 97.5° C.) Heating of the reactor was continued until the temperature reached 170°–175° C, and thereafter as necessary to maintain 170°–175° C during the run. When the temperature reached 170°–175° C, the reactor was pressurized with hydrogen to about 1000 psig and the hydrogen supply valve closed. After 14 minutes, the pressure had dropped 130 psig and the reactor was again pressurized with hydrogen to about 1000 psig and the hydrogen supply again closed. After 27 minutes from the start of operation at 100 psig, the pressure gage was again read. This time the pressure had dropped 110 psig. Again the reactor was quickly pressurized to about 1000 psig following which a drop of 100 psig was observed at the 38 minute point. The procedure was continued with measurement and rapid repressurization to about 1000 psig at the 49, 59, 67, 74, 84, 99, 117, 122, 134 and 142 minute points. The pressure drop results are tabulated hereinafter in the Δ column, the consecutive pressure drops being added together in sequence to provide the Σ pressure drop figures which are those used in plotting Curve A of FIG. 1. The foregoing procedure is a simple way to determine reaction rate as hydrogen uptake rate without requiring exact flow rate measurement for the pressurized hydrogen.

| Time (Minutes) | Pressure (psig) Δ | Σ |
|---|---|---|
| 0 | — | — |
| 14 | 130 | 130 |
| 27 | 110 | 240 |
| 38 | 100 | 340 |
| 49 | 130 | 470 |
| 59 | 110 | 580 |
| 67 | 160 | 740 |
| 74 | 120 | 860 |
| 84 | 130 | 990 |
| 99 | 130 | 1120 |
| 117 | 130 | 1250 |
| 122 | 30 | 1280 |
| 134 | 50 | 1330 |
| 142 | 5 | 1335 |

After the foregoing hydriding reaction, the vessel was cooled, the hydrogen pressure released and the contents subjected to filtration. The recovered solids were not dried but were allowed to remain toluene-moist after being washed with sufficient toluene to remove residual sodium aluminum diethyl dihydride catalyst. A 2 to 3 gram sample of the moist solids was further moistened with heavy oil (Nujol) and the sample was used for X-ray analysis confirming the trisodium aluminum hexahydride structure. Another 2 to 3 gram sample of the moist solids was added to 10 ml of tetrahydrofuran. No heat was evolved, indicating sodium aluminum tetrahydride was not formed. The mixture was then filtered and 50 ml normal pentane added to the filtrate. No precipitate was noted, indicating again the absence of sodium aluminum tetrahydride. The remainder of the solid material was slurried in 700 ml of toluene and 250 ml (208 grams) of triethyl aluminum was added. A vigorous exotherm was experienced immediately indicating a chemical reaction. The mixture was stirred for 1 hour and allowed to stand over night. The mixture was analyzed by gas-liquid chromatography (VPC) of acetophenone reduction products conducted on an aliquot portion and found to contain 2.42 millimols per milliliter of sodium aluminum diethyl dihydride. This corresponds to a yield of 87.9 percent.

EXAMPLE II

The 2-liter reactor was charged with 800 ml of toluene, 81.5 grams of sodium and 8.15 grams of sodium aluminum diethyl dihydride, the latter in a 25 wt. percent solution in toluene. The system was purged with hydrogen and approximately 100 psig hydrogen pressure allowed to remain in the reactor as heating was begun. The stirrer was turned on when the temperature reached 125° C. (The melting point of sodium is 97.5° C.) When the temperature reached 220° C, the reactor was pressurized with hydrogen to about 1000 psig and the hydrogen supply valve closed. After 2 minutes, the pressure had dropped 160 psig and the reactor was again pressurized with hydrogen to about 1000 psig and the hydrogen supply again closed. After 5 minutes from the start of operation at 1000 psig, the pressure gage was again read. This time the pressure had dropped 140 psig. Again the reactor was quickly pressured to about 1000 psig following which a drop of 120 psig was observed at the 8 minute point. The procedure was continued with measurement and rapid repressurization to about 1000 psig at the 13, 20, 23, 28 and 41 minute points. The pressure drop results are tabulated hereinafter in the Δ column, the consecutive pressure drops being added together in sequence to provide the Σ pressure drop figures which are those used in plotting Curve B of FIG. 1. Throughout the procedure the reactor temperature was held at about 220° C.

| Time (Minutes) | Pressure (psig) Δ | Σ |
|---|---|---|
| 0 | — | — |
| 2 | 160 | 160 |
| 5 | 140 | 300 |
| 8 | 120 | 420 |
| 13 | 130 | 550 |
| 20 | 80 | 630 |
| 23 | 20 | 650 |
| 28 | 5 | 655 |
| 41 | 5 | 660 |

After the reaction, the vessel was cooled, the hydrogen pressure released and the dispersion of NaH in toluene discharged into a receiver. The dispersion was filtered to separate the sodium hydride from the toluene solution of sodium aluminum diethyl dihydride catalyst. The solid remaining was analyzed and shown to be NaH of purity higher than 95 percent.

EXAMPLE III

Example II was repeated at 225° C using 100 grams of sodium, 50 grams of powdered aluminum, and 5 grams of sodium aluminum diethyl dihydride, and 500 ml of toluene.

| Time (Minutes) | Pressure (psig) Δ | Σ |
|---|---|---|
| 0 | — | — |
| 3 | 100 | 100 |
| 9 | 150 | 250 |
| 15 | 140 | 390 |
| 21 | 130 | 520 |
| 30 | 120 | 640 |
| 41 | 60 | 700 |
| 57 | 20 | 720 |

The data are plotted as curve C of FIG. 1.

The reaction rates of Examples II and III are comparable showing that the presence of the aluminum in Example III does not significantly affect reaction rate.

EXAMPLE IV

Example II was repeated at 270° C but using 100 grams of sodium, and 50 grams of aluminum powder, and 500 ml of toluene but without the $NaAl(C_2H_5)_2H_2$.

| Time (Minutes) | Pressure (psig) Δ | Σ |
|---|---|---|
| 0 | — | — |
| 5 | 140 | 140 |

-continued

| Time (Minutes) | Pressure (psig) Δ | Pressure (psig) Σ |
| --- | --- | --- |
| 10 | 100 | 240 |
| 21 | 110 | 350 |
| 35 | 70 | 420 |
| 65 | 90 | 510 |

The data are not plotted.

EXAMPLE V

Example II was repeated at 225° C with 490 ml toluene and 106.5 grams of sodium, but without the $NaAl(C_2H_5)_2H_2$.

| Time (Minutes) | Pressure (psig) Δ | Pressure (psig) Σ |
| --- | --- | --- |
| 0 | — | — |
| 7 | 105 | 105 |
| 18 | 80 | 185 |
| 25 | 60 | 245 |
| 37 | 100 | 345 |
| 52 | 100 | 445 |
| 73 | 105 | 550 |
| 102 | 110 | 660 |
| 182 | 30 | 690 |

The data are plotted as curve D of FIG. 1.

The preceding Examples II–V show a significantly higher reaction rate when the reaction is conducted in the presence of catalyst as specified and indicate that the presence of the aluminum powder does not significantly affect the reaction rate with reaction temperature above about 180° C. Thus where the sodium hydride is subsequently reacted with triethyl aluminum and hydrogen to produce sodium aluminum diethyl dihydride, the aluminum powder needed for the latter reaction is suitably and conveniently added to the reactor prior to the formation of the sodium hydride.

EXAMPLES VI–VIII

These examples were conducted in a 5-gallon stainless steel pressure vessel, jacketed for heating externally. The vessel was equipped with pressure gage, thermometer, a hydrogen feed system, internal cooling coil for temperature maintenance and rapid cooling after the reaction. The reactor was baffled and equipped with an electrically driven twin turbine stirrer. Pressuring with hydrogen was periodic to 1000 psig as in Examples I–V.

EXAMPLE VI

The 5-gallon reactor was charged with 5800 grams toluene, 270 grams aluminum powder, 644 grams sodium, and 340 grams of a 25 percent solution of sodium aluminum diethyl dihydride in toluene. (85 grams of contained $NaAlEt_2H_2$, 13.2 percent on the sodium fed for the reaction with hydrogen). The reactor was purged with hydrogen, leaving 100 psig residual hydrogen pressure. The heater was turned on and the stirrer started when the temperature reached 150° C. Reactor heating was continued until a temperature of 220° C was reached, which temperature was subsequently maintained during the course of the reaction. Hydrogen was then fed for a 43 minute total reaction time.

| Time (Minutes) | Pressure (psig) Δ | Pressure (psig) Σ |
| --- | --- | --- |
| 0 | — | — |
| 4 | 160 | 160 |
| 10 | 170 | 330 |
| 16 | 130 | 460 |
| 27 | 70 | 530 |
| 36 | 30 | 560 |
| 43 | 10 | 570 |

Figure 2:
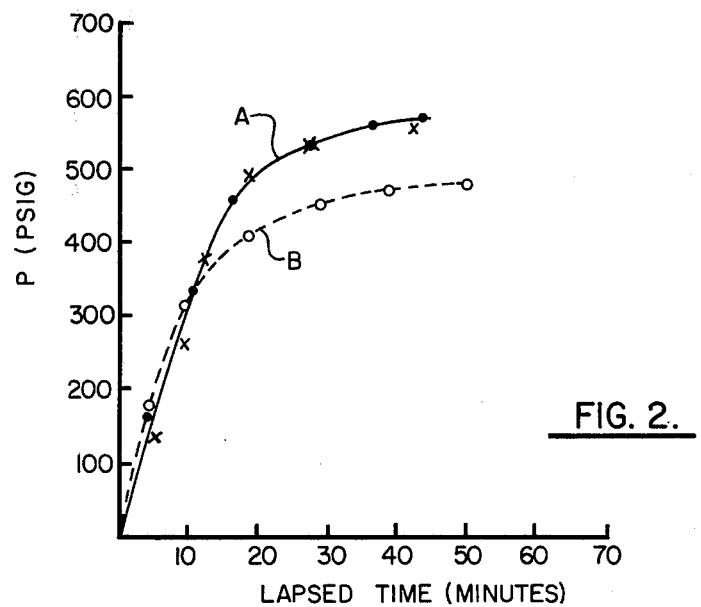
FIG. 2 of the drawings shows a group of two curves of pressure versus reaction time for the sodium hydride formation step of Examples VI, VII and VIII.

The data follow Curve A of FIG. 2.

The reactor was then cooled to 50° C, hydrogen pressure vented off and 2240 grams of liquid triethyl aluminum pressured into the reactor from a cylinder of triethyl aluminum.

The reactor was then heated to 170° C under hydrogen and then hydrogen was fed for a reaction time of 52 minutes at 170° C. Pressuring with hydrogen was periodic to 1000 psig as in the preceding sodium hydride preparation.

| Time (Minutes) | Pressure (psig) Δ | Pressure (psig) Σ |
| --- | --- | --- |
| 0 | — | — |
| 1 | 160 | 160 |
| 4 | 140 | 300 |
| 13 | 140 | 440 |
| 22 | 90 | 530 |
| 33 | 90 | 620 |
| 44 | 100 | 720 |
| 52 | 80 | 800 |

The reactor was again cooled to 50° C and hydrogen pressure vented off. 300 grams of tetrahydrofuran and 2125 grams of toluene were then pressured into the reactor. The reactor was then discharged and the product solution filtered yielding 11425 grams of solution. The solution was analyzed and found to contain 26.8 wt. percent $NaAlEt_2H_2$ in a yield of 98 percent based on sodium, 100 percent based on triethyl aluminum.

EXAMPLE VII

Example VI was repeated feeding 5950 grams of toluene, 300 grams of aluminum powder, 675 grams of sodium, and 240 grams of the 25 percent toluene solution of sodium aluminum diethyl dihydride. (60 grams of contained sodium aluminum diethyl dihydride, 8.9 percent on the sodium fed for the reaction with hydrogen). The time for the first reaction was 42 minutes.

| Time (Minutes) | Pressure (psig) Δ | Pressure (psig) Σ |
| --- | --- | --- |
| 0 | — | — |
| 5 | 130 | 130 |
| 9 | 130 | 260 |
| 12 | 120 | 380 |
| 18 | 110 | 490 |
| 27 | 40 | 530 |
| 42 | 30 | 560 |

The data follow curve A of FIG. 2.

The amount of triethyl aluminum fed was 2330 grams. The time for the subsequent or second reaction with hydrogen was 71 minutes.

| Time (Minutes) | Pressure (psig) Δ | Σ |
|---|---|---|
| 0 | — | — |
| 1 | 140 | 140 |
| 3 | 110 | 250 |
| 8 | 150 | 400 |
| 15 | 120 | 520 |
| 23 | 90 | 610 |
| 36 | 60 | 670 |
| 50 | 80 | 750 |
| 65 | 60 | 810 |
| 71 | 10 | 820 |

EXAMPLE VIII

A residual heel of several hundred milliliters retained from Example VII was used instead of feeding sodium aluminum diethyl dihydride. 670 grams of sodium, 300 grams of aluminum and 5000 grams of toluene were charged to the reactor. The reactor was heated to 220° C as in Example VII and then hydrogen fed for a 50 minute reaction at that temperature.

| Time (Minutes) | Pressure (psig) Δ | Σ |
|---|---|---|
| 0 | — | — |
| 4 | 170 | 170 |
| 9 | 141 | 310 |
| 18 | 100 | 410 |
| 29 | 40 | 450 |
| 38 | 20 | 470 |
| 50 | 10 | 480 |

Data from the Examples are plotted as follows.

| Example | Fig. |
|---|---|
| I | 1-A |
| II | 1-B |
| III | 1-C |
| IV | not plotted |
| V | 1-D |
| VI | 2-A |
| VII | 2-A |
| VIII | 2-B |

I claim:
1. A process for producing trialkali metal aluminum hexahydride which comprises:
  reacting
  1. alkali metal
  2. aluminum and
  3. hydrogen
in the presence of a catalytic amount of at least about 0.001 percent by weight of alkali metal aluminum dihydrocarbon dihydride, based on the alkali metal fed to the process, and of an inert aromatic hydrocarbon solvent for alkali metal aluminum dihydrocarbon dihydride, under conditions suitable to form trialkali metal aluminum hexahydride, thereby producing trialkali metal aluminum hexahydride.

2. The process of claim 1 wherein the catalyst is sodium aluminum diethyl dihydride.

3. The process of claim 1 for producing trisodium aluminum hexahydride wherein sodium is reacted 4. The process of claim 1 for producing tripotassium aluminum hexahydride wherein potassium is reacted.

5. The process of claim 1 for producing trilithium aluminum hexahydride wherein lithium is reacted.

6. The process of claim 1 wherein the solvent is toluene.

7. The process of claim 1 wherein the solvent is xylene.

8. The process of claim 1 wherein the solvent is benzene.

9. The process of claim 1 wherein the pressure of step A is from about 100 to about 2000 pounds per square inch gage.

10. The process of claim 1 wherein the pressure is from about 500 to about 1250 pounds per square inch gage.

11. The process of claim 1 wherein the temperature is from about 110° C to about 170° C.

12. The process of claim 1 wherein the temperature is from about 125° C to about 160° C.

13. The process of claim 1 wherein the temperature is about 170° C.

14. The process of claim 1 wherein the amount of catalyst is from about 0.1 percent to about 50 percent by weight based on the alkali metal fed to the process.

15. The process of claim 1 wherin the amount of catalyst is from about 1 percent to about 20 percent by weight based on the alkali metal fed to the process.

16. The process of claim 1 wherein the amount of catalyst is from about 10 to about 15 percent by weight based on the alkali metal fed to the process.

17. The process of claim 1 for producing trisodium aluminum hexahydride wherein sodium is reacted, the temperature is from about 110° C to about 170° C, the pressure of step A is from about 500 to about 1250 pounds per square inch gage and wherein the amount of catalyst is from about 10 to about 15 percent by weight based on the sodium reactant fed to the process.

18. The process of claim 1 wherein the amount of aluminum fed is in a molar excess ranging from about stoichiometric to about 50 percent excess about stoichiometric based on the alkali metal fed to the reaction.

* * * * *

UNITED STATES PATENT OFFICE
CERTIFICATE OF CORRECTION

PATENT NO. : 4,010,248
DATED : MARCH 1, 1977
INVENTOR(S) : GUNNER E. NELSON

It is certified that error appears in the above-identified patent and that said Letters Patent are hereby corrected as shown below:

Title Page, under "Other Publications", line 4, reads "Inorg. Chemitry", should read -- Inorganic Chemistry --. Item [57] Abstract, line 3, reads "potssium", should read -- potassium --. Column 1, line 6, reads "containuation", should read -- continuation --; line 43, reads "appartus", should read -- apparatus --. Column 2, line 24, reads "atomsphere", should read -- atmosphere --; line 33, reads "cabon", should read -- carbon --. Column 3, line 7, reads "suitble", should read -- suitable --; line 46, reads "intermedite", should read -- intermediate --. Column 5, line 45, reads "Preferaby", should read -- Preferably --. Column 6, line 24, reads "remian", should read -- remain --. Column 7, line 10, reads "howver,", should read -- however --; line 30, reads "metl", should read -- metal --. Column 8, line 55, reads "metling", should read -- melting --. Column 14, line 21, "of step" should have been left out; line 22, "A" should have been left out; line 36, reads "wherin", should read -- wherein --; line 45, "of step A" should have been left out; line 46, "wherein" should have been left out; line 51, reads "about", second occurrence, should read -- above --.

Signed and Sealed this nineteenth Day of July 1977

[SEAL]

Attest:

RUTH C. MASON
Attesting Officer

C. MARSHALL DANN
Commissioner of Patents and Trademarks